United States Patent [19]

Ficken et al.

[11] Patent Number: 4,703,654

[45] Date of Patent: Nov. 3, 1987

[54] LIQUID BEARING TWO DEGREE OF FREEDOM INERTIAL SENSOR APPARATUS

[75] Inventors: William H. Ficken, Berkeley Heights; Josephine Gonska, North Arlington, both of N.J.; Frank Gong, Staten Island, N.Y.

[73] Assignee: Allied Corporation, Morris Township, Morris County, N.J.

[21] Appl. No.: 811,183

[22] Filed: Dec. 20, 1985

[51] Int. Cl.⁴ .................. G01P 9/02; G01P 15/14; G01C 19/20; G01C 19/30
[52] U.S. Cl. .................. 73/504; 73/510; 73/516 R; 74/5.46; 74/5.7
[58] Field of Search .............. 33/328; 73/504, 510, 73/516 R; 74/5 R, 5.46, 5.7

[56] References Cited

U.S. PATENT DOCUMENTS

| | | | |
|---|---|---|---|
| 3,490,297 | 1/1970 | Brodersen | 74/5.46 |
| 3,706,231 | 12/1972 | Noar et al. | 74/5 R |
| 3,878,730 | 4/1975 | Stripling et al. | 74/5.7 |
| 4,290,316 | 9/1981 | Noar et al. | 74/5.46 |
| 4,320,669 | 3/1982 | Grohe | 74/5.7 |

Primary Examiner—Stewart J. Levy
Assistant Examiner—John E. Chapman, Jr.
Attorney, Agent, or Firm—Howard G. Massung; Stanley N. Protigal

[57] ABSTRACT

Liquid bearing two degree of freedom inertial sensor apparatus is disclosed. A single liquid bearing sensor is configured in a two degree of freedom rate gyro mode, or two of the liquid bearing sensors are made pendulous along their spin axes and configured in a two degree of freedom rate gyro and accelerometer mode.

6 Claims, 4 Drawing Figures

LIQUID BEARING TWO DEGREE OF FREEDOM INERTIAL SENSOR APPARATUS

BACKGROUND OF THE INVENTION

Inertial sensor apparatus is used in guidance systems for air or space craft, or missiles or projectiles or other like vehicles. The apparatus may include sensors such as gyroscopes (gyros) for sensing the rate of change of attitude (rate) of the vehicle along its axes and/or accelerometers for sensing the acceleration of the vehicle along said axes. In some such apparatus a mass is suspended by a bearing arrangement and is driven to spin or rotate about a spin axis, and the rate or acceleration is sensed along an input axis or axes. Torquing and signal generating devices are arranged about the output and input axis or axes, respectively, of the sensor to provide signals corresponding to the sensed condition, i.e. rate of acceleration.

Such inertial sensor apparatus may have a hydrodynamic bearing arrangement, wherein a gas is usually used as the working fluid. This implies tight fluid gaps, close tolerances, large bearing sizes and relatively high rotational speed of the sensor mass to achieve high angular momentum and high environmental (performance) acceleration capability.

Tactical sensor apparatus, i.e. sensor apparatus used, for example, in systems to guide missiles fired from tanks or aircraft or other like vehicles usually requires a small, rugged sensor, but does not necessarily require the aforenoted high angular momentum and thus permits reduced rotational speed. The present invention takes advantage of the aforenoted by replacing a working gas with a working liquid so that relatively open gaps, loose tolerances and smaller bearing sizes, with an associated decrease in the rotational speed of the mass, are acceptable. The liquid, by way of buoyancy and increased viscosity, significantly enhances the environmental (performance) capability of the sensor apparatus. Sensor apparatus is thus provided having cost effective characteristics and improved reaction time to achieve the decreased rotational speed, as will now be understood.

In this connection it is noted that in some inertial sensor apparatus using a liquid as the working fluid, a neutrally buoyant mass or an external pump for the liquid is required, adding to the complexity of the apparatus. In the present invention the requirement for the neutral buoyancy or an external pump is avoided by arranging the components thereof to provide an internal pumping action.

SUMMARY OF THE INVENTION

This invention contemplates inertial sensor apparatus wherein a sensor includes a mass suspended by a liquid hydrodynamic bearing arrangement including a ball supported by a shaft and disposed within the mass to form a gap therewith, and which gap is filled with a working liquid. The mass is driven by a motor, and torquers and pick-offs are arranged in a dual axis, i.e. two degree of freedom, configuration. In one embodiment of the invention the shaft is fixed within the sensor case so as to rotate with the mass, whereby two axes of rate are sensed. In another embodiment of the invention, wherein the apparatus functions in a higher environmental acceleration mode, the shaft is journalled in the case and driven by a motor in a direction counter to the direction of rotation of the sensor mass, whereby the differential velocity across the gap is increased to increase the acceleration capability of the apparatus.

DETAILED DESCRIPTION OF THE INVENTION

Figure 1:
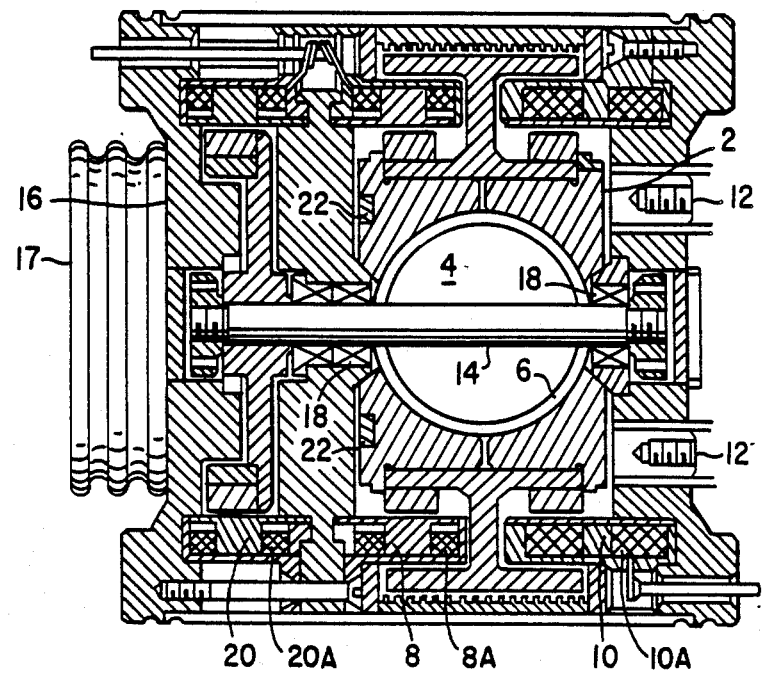
FIG. 1 is a sectional view of inertial sensor apparatus to the invention.

With reference to FIG. 1, a mass designated by the numeral 2 is suspended by a liquid spherical hydrodynamic bearing arrangement. The bearing arrangement includes a ball 4 disposed in mass 2. The ball and mass are arranged to provide a gap 6. Gap 6 is filled with a working liquid such as, for purposes of example, a low viscosity oil or some other such suitable liquid, as is well known in the art.

Mass 2 is driven by a motor designated generally by the numeral 8 including a winding 8A to spin or rotate about a spin axis. The arrangement includes torquers designated generally by the numeral 10 including windings 10A and pickoffs designated generally by the numeral 12. Torquers 10 torque the sensor about its output axes and pick-offs 12 function as signal generators to provide appropriate sensor signals, as is well known in the art. The relationship between the aforenoted axes will be next described with specific reference to FIG. 2.

It is noted that the gimballing arrangement of the apparatus (not otherwise shown) is such that torquers 10 and pick-offs 12 may be in a dual axis (two degree of freedom) arrangement, with only one of the axes being shown in FIG. 1. The relationship between the spin axis and the two input axes will best be understood with reference to FIG. 2, wherein three mutually perpendicular axes are shown, i.e. input Axis $IA_1$; input Axis $IA_2$; and spin axis SA. Mass 2 rotates about spin axis SA and rate is sensed along axes $IA_1$ and $IA_2$. Hence the sensor apparatus has two degrees of freedom. That is to say, one degree of freedom about axis $IA_1$ and another degree of freedom about axis $IA_2$. It will be understood that in the arrangement described there is actually a third degree of freedom about primary suspension axis SA.

As shown in FIG. 1, ball 4 is supported by a shaft 14. In one embodiment of the invention, wherein the disclosed apparatus functions in a gyro mode, shaft 14 is fixed (not otherwise shown) in a sensor case 16.

In another embodiment of the invention, as shown in FIG. 1, in order to enhance environmental capabilities, shaft 14 is journalled in case 16 via suitable bearings 18. Shaft 14 is driven by a motor 20 including a winding 20A in a direction counter to the direction of rotation mass 2. This feature of the invention increases the differential angular velocity across gap 6, thereby increasing the acceleration capability of the described apparatus.

Sensor case 16 supports a temperature compensating bellows 17, the same being well known in the art.

As heretofore noted, a feature of the invention is that a liquid hydrodynamic bearing is provided without the need for an external pump. This feature is best illustrated and described with reference to FIG. 3.

Figure 2:
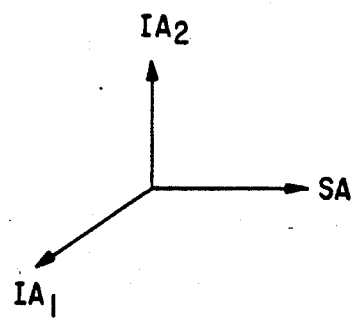
FIG. 2 is a vector diagram showing the relationship between the spin axis of the sensor apparatus and the two input axes thereof.
Figure 3:
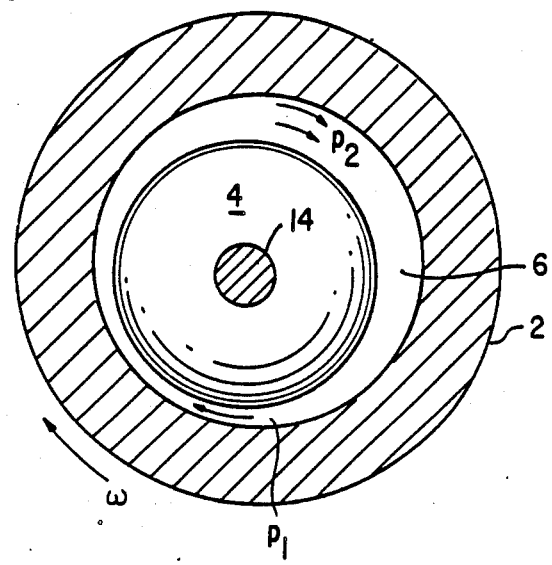
FIG. 3 is a diagrammatic representation illustrating the internal liquid pumping feature of the invention.

Thus as shown in FIG. 3, mass 2 rotates about spin axis SA (FIG. 2) at an angular velocity $\omega$. Ball 4 and mass 2 form a gap 6, said gap being filled with a suitable liquid as aforenoted.

Due to the force of gravity, ball 4 is initially eccentrically disposed within gap 6, with the gap being greater on one side of the ball than on the other side. The hydrodynamic pressure on the one side of the ball is designated as $p_1$, and said pressure on the other side of the ball is designated as $p_2$, with $p_2$ being greater than $p_1$, ($p_2 > p_1$). Thus as mass 2 rotates an internal pumping action of the liquid around the ball occurs. The tendency is for the ball to thereupon become centered in gap 6.

With further reference to FIG. 1, a pendulosity feature may be incorporated into the invention, as is required when the apparatus is used in a dual gyro and accelerometer mode. Thus, as shown in the FIG. 1, one side of mass 2 is unbalanced relative to the other side of the mass via weights 22. It is noted that weights 22 may be replaced by grooves or the like to provide the aforenoted unbalanced condition. As will now be understood, this feature of the invention renders mass 2 pendulous along spin axis SA (FIG. 2).

Another feature of the invention is that two pendulous, two degree of freedom liquid bearing inertial sensors may be packaged with suitable processing electronics to provide two gyro (rate) axes outputs and two accelerometer axes outputs simultaneously. This dual sensor, two degree of freedom configuration is illustrated with reference to FIG. 4.

Thus, a first sensor is designated generally by the numeral 24 and a second sensor is designated generally by the numeral 26. Sensors 24 and 26 are structurally as described with reference to FIGS. 1, 2 and 3. Sensor 24 includes a mass, such as mass 2 shown in FIG. 1, which is driven to rotate in one direction about a spin axis $SA_1$ as shown by the arrow. Sensor 26 has a like mass which is driven to rotate in an opposite direction about a spin axis $SA_2$ as shown by the arrow. Sensors 24 and 26 include torquers and pick-offs such as 10 and 12 described with reference to FIG. 1 which provide appropriate signals $T_1$, $S_1$ and $T_2$, $S_2$. The torquer ($T_1$, $T_2$) and pick-off ($S_1$, $S_2$) signals from sensors 24 and 26 are applied to conventional processing electronics designated generally by the numeral 28. Processing electronics 28 provides an acceleration output which is the summation of signals $T_1$ and $T_2$ and provides a rate output which is the difference between signals $T_1$ and $T_2$. The output scale factors and polarities are appropriately addressed, as is well known in the art.

Figure 4:
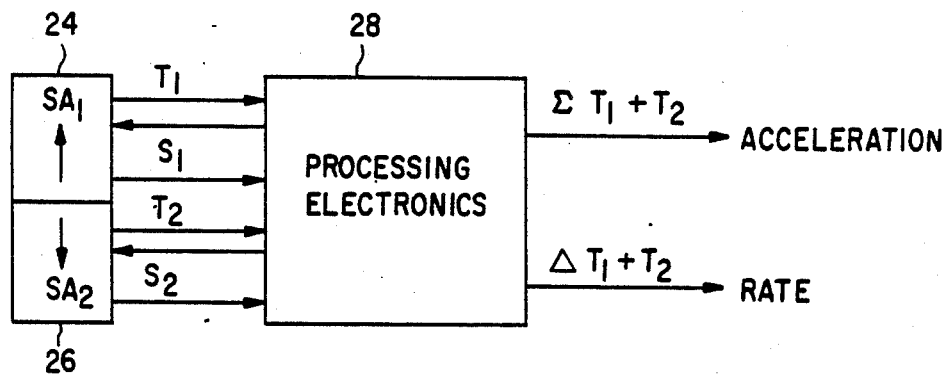
FIG. 4 is a diagrammatic representation showing an embodiment of the invention wherein the apparatus functions in a dual, gyro and accelerometer, mode.

It will be understood that FIG. 4 illustrates a single axis output, but in the arrangement shown and described dual axis (two degrees of freedom) gyro and accelerometer outputs may be provided in accordance with the aforegoing description of the invention, as will now be understood.

There has thus been described two degree of freedom sensor apparatus utilizing a liquid spherical hydrodynamic bearing. The apparatus is smaller than single degree of freedom apparatus now known in the art and provides two degrees of freedom at comparable performance and at reduced cost.

Dual sensor implementation, i.e. gyro and accelerometer implementation, may be achieved by packaging two of the aforenoted two degree of freedom sensors with appropriate processing electronics.

With the above description of the invention in mind, reference is made to the claims appended hereto for a description of the scope of the invention.

What is claimed is:

1. Inertial sensor apparatus including a first sensor, characterized by:
   a first case;
   a first mass;
   a first bearing arrangement for suspending the first mass in the first case;
   the first bearing arrangement including a shaft rotatably supported in the first case, and a ball supported by the shaft and initially eccentrically disposed within the first mass and forming a gap therebetween, said gap being filled with a liquid;
   means for rotating the first mass about a first axis in one direction for providing a pumping action for the liquid in said gap, whereby the liquid is pumped around the ball of the first bearing arrangement, with said ball thereupon tending to be centered in said gap;
   means for rotating the shaft of the first bearing arrangement in a direction counter to the direction of rotation of the first mass, whereby the differential angular velocity across the gap is increased;
   first sensing means arranged in a two degree of freedom configuration for sensing a rate of change of attitude of a vehicle along a second axis, and for sensing a rate of change of attitude of said vehicle along a third axis, said first, second and third axes being mutually perpendicular; and
   said first sensing means providing signals corresponding to said sensed rates of change of attitude.

2. Inertial sensor apparatus as described by claim 1 including a second sensor, characterized by:
   a second case;
   a second mass;
   a second bearing arrangement for suspending the second mass in the second case;
   the second bearing arrangement including a shaft rotatably supported in the second case and a ball supported by the shaft and disposed within the seoond mass for forming a gap therebetween, said gap being filled with a liquid;
   means for rotating the second mass in one direction about a fourth axis;
   means for rotating the shaft of the second bearing arrangement in a direction counter to the direction of rotation of the second mass, whereby the differential angular velocity across said gap is increased;
   the ball of the second bearing arrangement being initially eccentrically disposed within the second mass, and the rotation of said second mass providing a pumping action for the liquid in said gap, whereby said liquid is pumped around the ball of the second bearing arangement, with said ball thereupon tending to be centered in said gap;
   second sensing means arranged in a two degree of freedom configuration for sensing a rate of change of attitude of the vehicle along a fifth axis, and for sensing a rate of change of attitude of said vehicle along a sixth axis, said fourth, fifth and sixth axes being mutually perpendicular; and
   said second sensing means providing signals corresponding to said sensed rates of change of attitude.

3. Inertial sensor apparatus as described by claim 2, further characterized by:
  means for unbalancing one side of the first mass relative to the other side, whereby said first mass is rendered pendulous along the first axis; and
  means for unbalancing one side of the second mass relative to the other side, whereby said second mass is rendered pendulous along the fourth axis.

4. Inertial sensor apparatus as described by claim 13, further characterized by:
  the means for rotating the second mass rotating said mass in a direction opposite to the direction of rotation of the first mass.

5. Inertial sensor apparatus as described by claim 4, further characterized by:
  means connected to the first sensor and to the second sensor and responsive to the signals from the first and second sensing means thereof corresponding to the sensed rates of change of attitude for providing signals corresponding to the rates of change of attitude of the vehicle along first and second vehicle axes, and for providing signals corresponding to the accelerations of said vehicle along said first and second vehicle axes.

6. Inertial sensor apparatus as described by claim 5, wherein the means connected to the first sensor and to the second sensor and responsive to the signals from the first and second sensing means thereof corresponding to the sensed rates of change for providing signals corresponding to the rates of change of attitude of the vehicle along first and second vehicle axes, and for providing signals corresponding to the accelerations of said vehicle along said first and second vehicle axes is characterized by:
  means responsive to the difference between the signals from the first and second sensing means or providing the accelerations signals; and
  means responsive to the sum of the signals from the first and second sensing means for providing the rate of change of attitude signals.

* * * * *